(12) United States Patent
Kuroda (10) Patent No.: US 8,360,450 B2
(45) Date of Patent: Jan. 29, 2013

(54) STABILIZER DEVICE

(75) Inventor: Shigeru Kuroda, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 126 days.

(21) Appl. No.: 13/000,771

(22) PCT Filed: Jul. 10, 2009

(86) PCT No.: PCT/JP2009/062580
§ 371 (c)(1),
(2), (4) Date: Dec. 22, 2010

(87) PCT Pub. No.: WO2010/007942
PCT Pub. Date: Jan. 21, 2010

(65) Prior Publication Data
US 2011/0115182 A1    May 19, 2011

(30) Foreign Application Priority Data

Jul. 18, 2008  (JP) ................. 2008-187008

(51) Int. Cl.
*B60G 21/05* (2006.01)
(52) U.S. Cl. .............................. 280/124.106
(58) Field of Classification Search ........... 280/124.106, 280/124.13, 124.131; 267/276, 279, 280, 267/281, 292
See application file for complete search history.

(56) References Cited

U.S. PATENT DOCUMENTS

| | | | | |
|---|---|---|---|---|
| 5,984,283 | A * | 11/1999 | Tsuiki et al. | 267/33 |
| 6,474,631 | B2 * | 11/2002 | Hadano et al. | 267/276 |
| 2001/0045694 | A1 | 11/2001 | Hadano et al. | |
| 2003/0175073 | A1 | 9/2003 | Funke | |
| 2010/0244395 | A1 * | 9/2010 | Sugiura et al. | 280/124.107 |
| 2011/0169242 | A1 * | 7/2011 | Kuroda | 280/124.165 |
| 2011/0170814 | A1 * | 7/2011 | Nakamura et al. | 384/125 |

FOREIGN PATENT DOCUMENTS

| | | |
|---|---|---|
| EP | 0 900 677 A1 | 3/1999 |
| GB | 2 239 440 A | 7/1991 |
| JP | A-63-57310 | 3/1988 |
| JP | 11082625 A * | 3/1999 |
| JP | A-2001-163026 | 6/2001 |
| JP | A-2001-165127 | 6/2001 |
| JP | A-2001-260624 | 9/2001 |
| WO | WO 2009/104815 A1 | 8/2009 |

OTHER PUBLICATIONS

International Search Report dated Aug. 29, 2009 in International Patent Application No. PCT/JP2009/062580.
Mar. 1, 2012 Supplementary Search Report issued in European Patent Application No. 09797867.0.

* cited by examiner

*Primary Examiner* — Faye M. Fleming
(74) *Attorney, Agent, or Firm* — Oliff and Berridge, PLC (57) ABSTRACT

A stabilizer device includes a bar having a portion to be mounted to a vehicle body. A resin ring is integrally formed to the bar by a direct injection method, and a bush made of rubber is provided around the periphery of the resin ring. The bush is fixed to a member of the vehicle body side by a bracket. Since the contact area of the resin ring to the bar is secured by using the axial direction length of the bush, the movement strength of the bush in the axial direction can be improved even when there is size restriction. In the fixing construction of the stabilizer device, the movement of the bush to the bar can be sufficiently prevented even when the size restriction is severe.

5 Claims, 8 Drawing Sheets

Fig. 11

STABILIZER DEVICE

TECHNICAL FIELD

The present invention relates to a stabilizer device provided to vehicles.

BACKGROUND ART

When a vehicle having a stabilizer device rolls in running at a curve and the inputs are provided to a left suspension mechanism and a right suspension mechanism so as to have phases opposite to each other in an upper direction and in a lower direction, a left arm and a right arm bend in directions opposite to each other, and a torsion portion of the stabilizer device is twisted, so that force which inhibits the vehicle roll is generated. A bar of the stabilizer device is fixed at a vehicle body side via a bush made of rubber. For example, a construction for fixing of the stabilizer device to the vehicle body has been disclosed in Japanese Unexamined Patent Application Publication Nos. 2001-163026 and 2001-165127.

In a stabilizer device, centrifugal force acts during cornering of vehicle, force is generated to a bar of the stabilizer device in an axial direction in which a bush may move relatively to the bar. When the bush moves relatively to the bar, the effects by the stabilizer device are not equal at the left side and the right side, and the initial effects cannot be obtained. In order to inhibit the movement of the bush, a construction may be provided such that a stopper member for prevention of bush movement is disposed proximate to the bush. However, in this construction, size should be ensured for disposing of stopper member. In this case, when the size restriction is severe, contact area of the stopper member and the bar for obtaining sufficient frictional force therebetween cannot be secured.

DISCLOSURE OF THE INVENTION

An object of the present invention is to provide a stabilizer device having a construction for fixing of a bush to a bar, which can prevent the movement of the bush to the bar even when the size restriction is severe.

According to one aspect of the present invention, a stabilizer device includes: a bar which has a torsion portion and arm portions extending from both end portions of the torsion portion; a tubular resin member which is fixed at the torsion portion and has a length in an axial direction; and a bush which is fixed at the periphery of the tubular resin member and has a length in an axial direction, wherein the length of the tubular resin member is equal to or longer than that of the bush.

In the stabilizer device of the present invention, the tubular resin member is disposed between the bush and the bar, and the resin material prevents the movement of the bush to the bar in the axial direction. Since the tubular resin member is disposed coaxially with the bush, the contact area between the bar and the resin member can be secured by using the size of the bush. Thus, the movement strength (the strength against the force by which the bar moves to the resin member) due to frictional resistance between the bar and the resin member can be obtained.

The word "tuburar shape" may mean a hollow shape which extends in one direction and has a length which is freely selected. The hollow shape has a cross section of cavity perpendicular to the axial direction, and the cross section of the cavity may be circular, ellipsoidal, or polygonal. The outer shape of the cross section perpendicular to the axial direction may be a horseshoe shape or a polygonal shape.

According to a preferred embodiment of the present invention, a flange portion for preventing movement of the bush in the axial direction is provided at least one end of the tubular resin member. In this embodiment, the flange portion may contact the end surface of the bush, thereby inhibiting the axial direction movement of the bush.

According to a preferred embodiment of the present invention, the tubular resin member has a concavo-convex structure at a peripheral surface of the tubular resin member. In this embodiment, the inner peripheral surface of the bush can engage with the concavo-convex structure of the peripheral surface of the tubular resin member, and the strength for inhibition of the movement of the bush can be higher by the anchor effect.

According to a preferred embodiment of the present invention, the bush has an inner peripheral surface having a shape engaging with the concavo-convex structure of the tubular resin member. In this embodiment, the concavo-convex structure of the bush can engage with the concavo-convex structure of the tubular resin member, and the anchor effect can be higher.

According to a preferred embodiment of the present invention, the tubular resin member is integrally formed to the torsion portion. In this embodiment, since the tubular resin member may not use a separate structure or a division structure, the strength of the tubular resin can be higher. Since the adhesion of the tubular resin to the bar can be secured, the movement prevention strength (movement strength) of the tubular resin to the bar can be superior to that of a case in which a separate structure or a division structure is used.

According to a preferred embodiment of the present invention, a concavo-convex structure is formed on a surface of the torsion portion on which the tubular resin member is fixed. In this embodiment, the adhesion between the bar and the tubular resin member can be improved, so that the movement strength of the tubular resin to the bar can be improved.

Effects of the Invention

According to the present invention, in the fixing construction of the stabilizer device, the movement of the bush to the bar can be sufficiently prevented even when the size restriction is severe.

EXPLANATION OF REFERENCE NUMERALS 1 denotes a stabilizer device, 2 denotes a tire, 3 denotes a suspension device, 4 denotes a tire, 5 denotes a suspension device, 10a denotes a portion to be mounted to a vehicle body via a bush, 10b denotes a portion to be mounted to a vehicle body via a bush, 11 denotes a stabilizer link, 12 denotes a movable joint, 13 denotes an arm, 20 denotes a bracket, 24 denotes a bracket, 20a denotes a flange, 20b denotes a flange, 30 denotes a bush, 31 denotes a bush, 30a denotes a dotted line showing a portion at which a split is formed, 40 denotes a resin ring, 41 denotes a resin ring, 40a denotes a flange, 40b denotes a flange, 50 denotes a member of a vehicle side, 100 denotes a bar, 110 denotes a torsion portion, 120a denotes an arm portion, 120b denotes an arm portion, 121a denotes a flattened portion, 121b denotes a flattened portion, 122a denotes a mounting hole, 122b denotes a mounting hole, 201 denotes a bolt, and 203 denotes a bolt.

BEST MODE FOR CARRYING OUT THE INVENTION

Stabilizer Device

Figure 1:
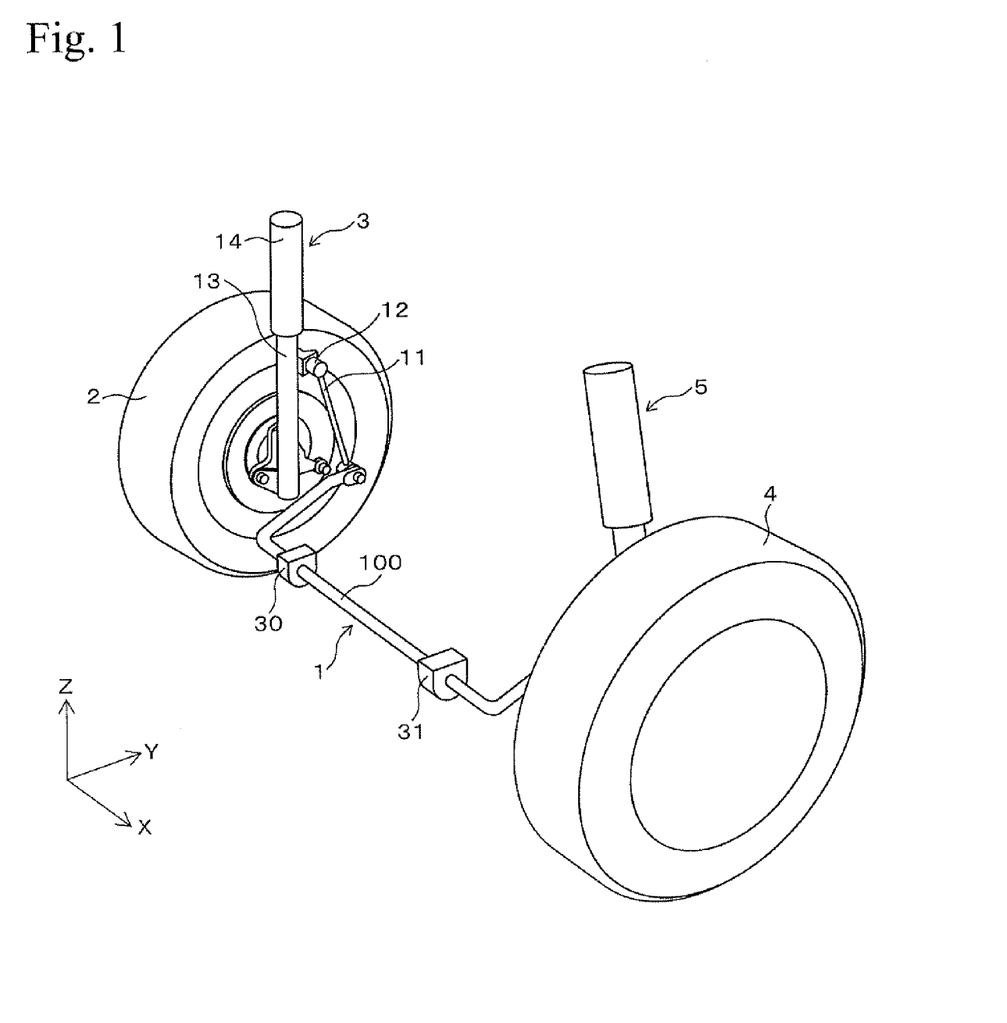
FIG. 1 is a conceptual diagram showing a stabilizer device, which is mounted to a vehicle body, and a surrounding portion.

One example of a stabilizer device using one embodiment of the present invention will be explained hereinafter. FIG. 1 is a schematic diagram showing a stabilizer device and a surrounding construction. FIG. 1 shows the condition in which a stabilizer device 1 is mounted to a front wheel side of vehicle. The stabilizer device 1 is equipped with a bar 100 bending to be approximately U-shaped. A stabilizer link 11, which is a rod-like member, is mounted to an end of the bar 100, and another end of the stabilizer link 11 is fixed at an arm 13 of a suspension device 3 via a movable joint 12. A lower end of the arm 13 is fixed at a bearing which supports a shaft of a tire 2, and an upper end of the arm 13 is connected to a cylinder 14 which is elastically movable relatively to the arm 13. The cylinder 14 is a portion of the suspension device 3, and weight of vehicle body (not shown in FIG. 1) is applied to the cylinder 14.

The arm 13 and the cylinder 14 are connected via a coil spring (not shown in FIG. 1), and an elastic connection mechanism is realized therebetween. The other end side (not shown in FIG. 1) of the bar 100 is connected to the suspension 5. The suspension 5 supports the weight of the vehicle which is applied to the tire 4. The bar 100 is mounted to the vehicle body side (not shown in FIG. 1) via the bushes 30 and 31.

Figure 2:
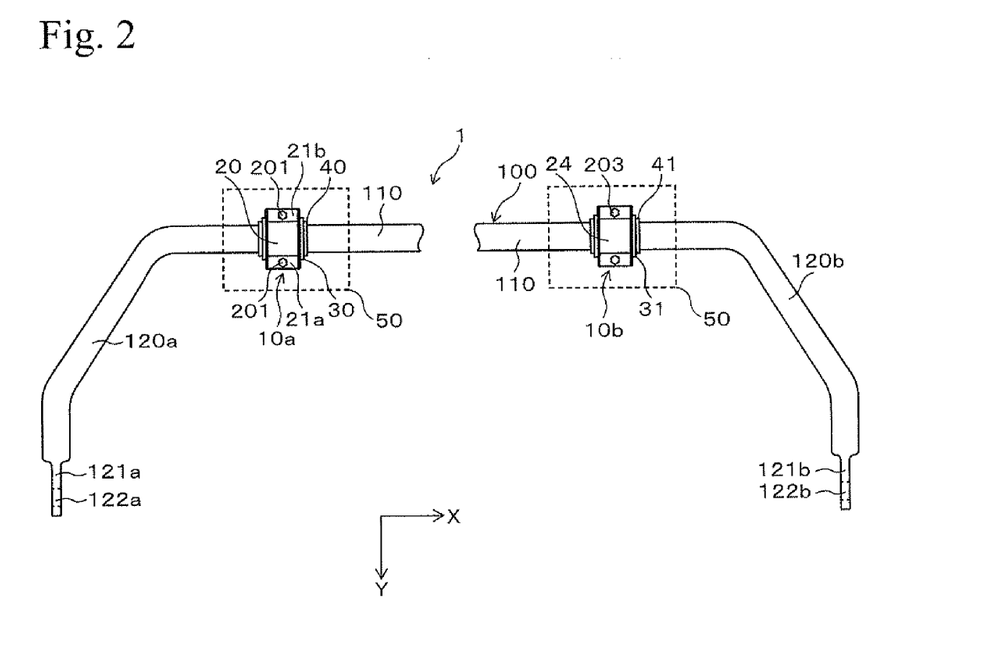
FIG. 2 is a lower schematic view showing the stabilizer device which is mounted to the vehicle body.

FIG. 2 is a bottom view showing the condition of the stabilizer device 1 seen from the lower side (seen toward the plus direction of Z-axis). FIG. 2 shows the condition in which the stabilizer device 1 is mounted to the vehicle body. The stabilizer device 1 is equipped with the bar 100 formed such that a metal hollow pipe or a metal solid pipe is subjected to press working. The bar 100 has a torsion portion 110 and arm portions 120a and 120b extending from both end portions of the torsion portion 110.

The torsion portion 110 is a portion at which torsion mainly generates. Portions 10a and 10b of the torsion portion 110, which are proximate to both ends of the torsion portion 110, is fixed on a member 50 of the vehicle side via the bushes 30 and 31. The end portions of the arm portions 120a and 120b have flattened portions 121a and 121b. Mounting holes 122a and 122b for mounting a stabilizer link (for example, reference numeral 11 in FIG. 1) are formed on the flattened portions 121a and 121b.

Construction of Mounting Portion via Bush

Figure 3A:
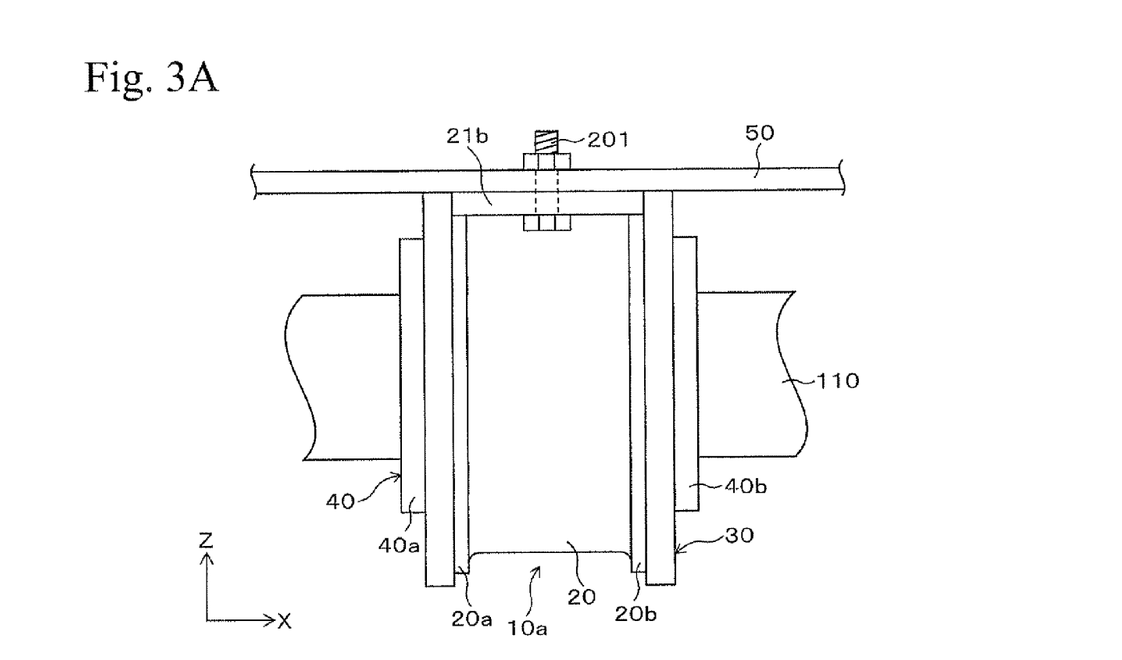
FIGS. 3A and 3B are a side view and a cross sectional view showing a mounted portion of the stabilizer device.
Figure 3B:
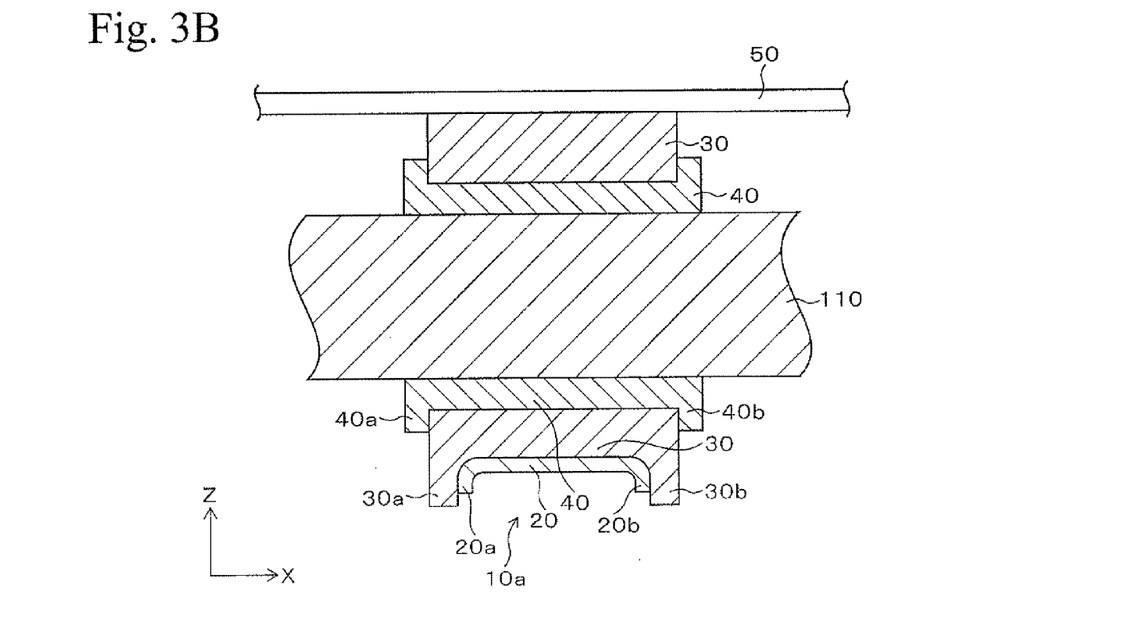
Figure 4:
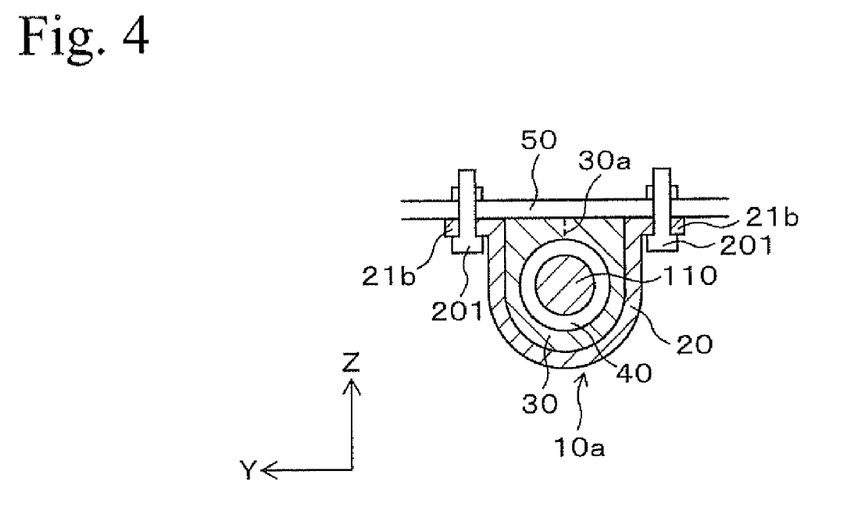
FIG. 4 is a cross sectional view showing a portion of mounting the stabilizer device to the vehicle body.

FIG. 3A is an enlarged diagram showing the portion 10a in FIG. 2, which is seen toward the plus direction of Y-axis. FIG. 3B is a cross sectional view showing the portion in FIG. 3A, which is divided vertically along the axial direction of the torsion portion 110. FIG. 4 is a cross sectional view showing the portion 10a in FIG. 2, which is seen from the axial direction of the torsion portion 110. Since the portions 10a and 10b have the same construction, the portion 10a will be mainly explained hereinafter.

A cylindrical resin ring 40 is formed at the portion 10a on the peripheral surface of the torsion portion 110 of the bar 100. The resin ring 40 is integrally molded by direct injection method. The resin ring 40 is composed of polyphenylene sulfide, and it is one example of cylindrical resin member functioning as a movement stopper member. A resin material (for example, polyether ether ketone) may be used. In order to ensure the fluidity of the resin in injection molding, the resin ring 40 desirably has a thickness of 1.0 mm or more. The upper limit of the thickness is not limited in particular, and the upper limit thereof is desirably about 10 mm. The direct injection method will be explained hereinafter. A base for the resin ring 40 (surface of torsion portion 110 contacting the resin ring 40) is subjected to surface roughening by shot peening, so that the adhesion thereof to the resin material is improved.

As shown in FIGS. 3A and 3B, flanges 40a and 40b are formed at both axial direction ends of the resin ring 40. The flanges 40a and 40b inhibit the axial direction movement of the bush 30.

The bush 30 made of rubber is provided around the periphery between the flanges 40a and 40b of the resin ring 40. The bush 30 has a horseshoe shape (in the Figures, inverted U-shape) having a columnar cavity formed at the center thereof in an axial direction. The bush 30 is structured such that a split is formed at a portion shown by a dotted line 30a in FIG. 4. The resin ring 40 is covered with the bush 30 such that the portion shown by the dotted line 30a is open, and the resin ring 40 is disposed in the cavity of the bush 30. The bush 30 is provided in the condition shown in the Figures. The bush 30 can use an elastic member having a predetermined strength. For example, the bush 30 can use urethane other than rubber.

As shown in FIGS. 3A and 4, the bush 30 is covered with a bracket 20 made of metal from the lower side. The bracket 20 is fixed on a member 50 (frame portion of vehicle body or the like) by bolts 201.

Figure 5:
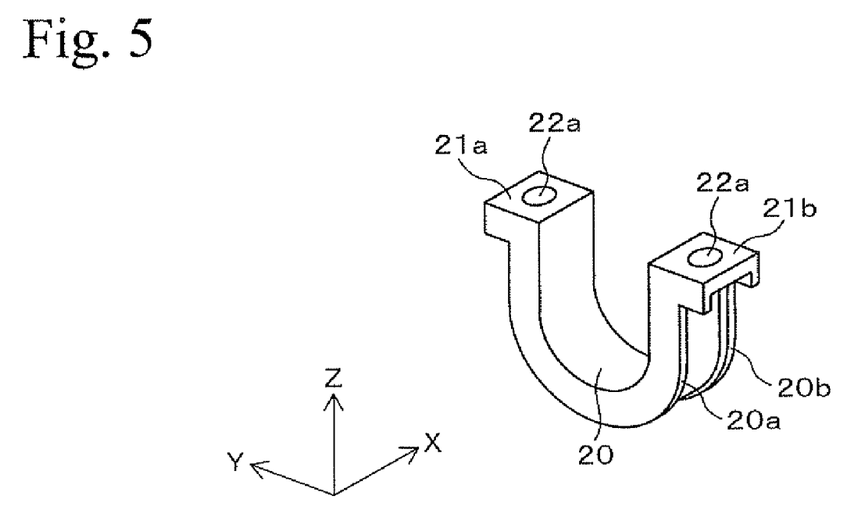
FIG. 5 is a schematic perspective view showing a bracket.

Specifically, as shown in FIG. 5, the bracket 20 has mounting surfaces 21a and 21b, and bolt holes 22a and 22b are formed thereat. The bracket 20 is fixed on the member 50 of the vehicle body side by the bolts 201, which screw to the bolt holes 22a and 22b, such that the bush 30 is disposed therebetween. That is, the bush 30 is fixed so as to be pressed toward the member 50 of the vehicle body by the bracket 20.

Flanges 20a and 20b are provided at both axial direction edges of the bracket 20. The flanges 20a and 20b secure the strength of the bracket. The axial direction size of the bracket 20 is set smaller than that of the bush 30. When the bolts 201 are screwed, as shown in FIGS. 3A and 3B, the bracket 20 is embedded to the bush 30, and the bush 30 protrudes outwardly from the front side and rear side of the bracket 20.

In the above construction, the torsion portion 110 is mounted to the member 50 of the vehicle body side (that is, vehicle body). As described above, the construction of the portion 10a in FIG. 2 is explained in detail, and the portion 10b has the same construction as the portion 10a. That is, in the portion 10b, the resin ring 41 is provided on the torsion portion 110 by integral molding, and the resin ring 41 is covered with the bush 31. The bush 31 is fixed so as to be pressed toward the member 50 of the vehicle body by the bracket 24. FIGS. 1 and 2 show the case in which the number of the bushes is two, and the number of the bushes may be three or more.

Production Method for Stabilizer Device

Figure 6A:
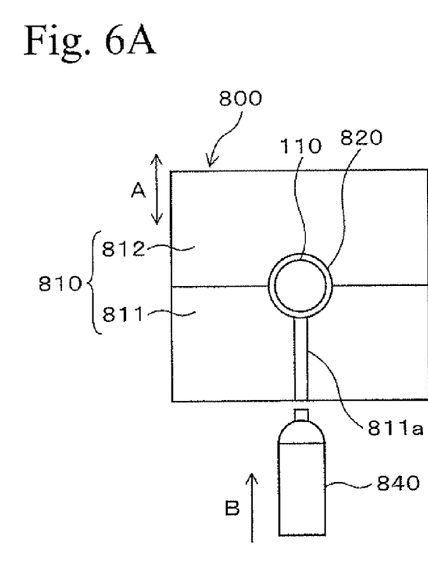
FIGS. 6A and 6B are cross sectional views showing an injection molding machine.
Figure 6B:
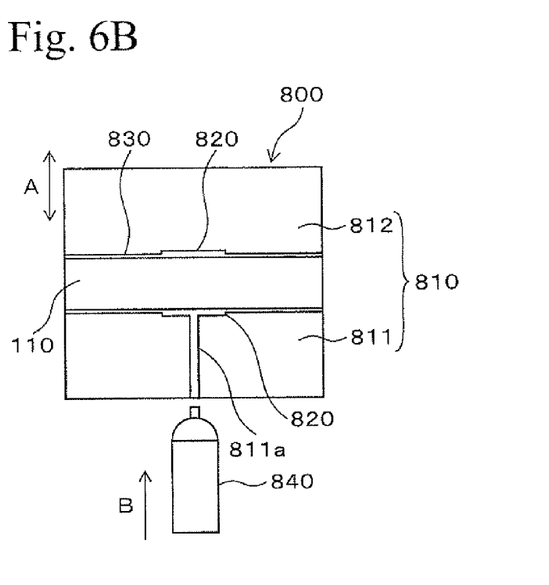
Figure 7:
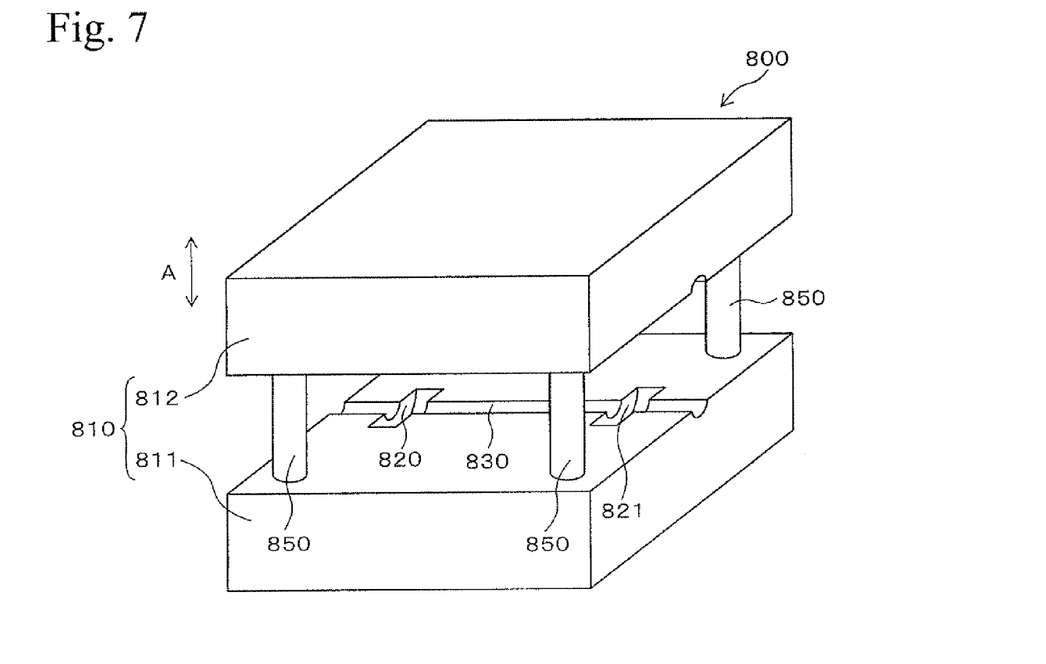
FIG. 7 is a cross sectional view showing an injection molding machine.
Figure 8:
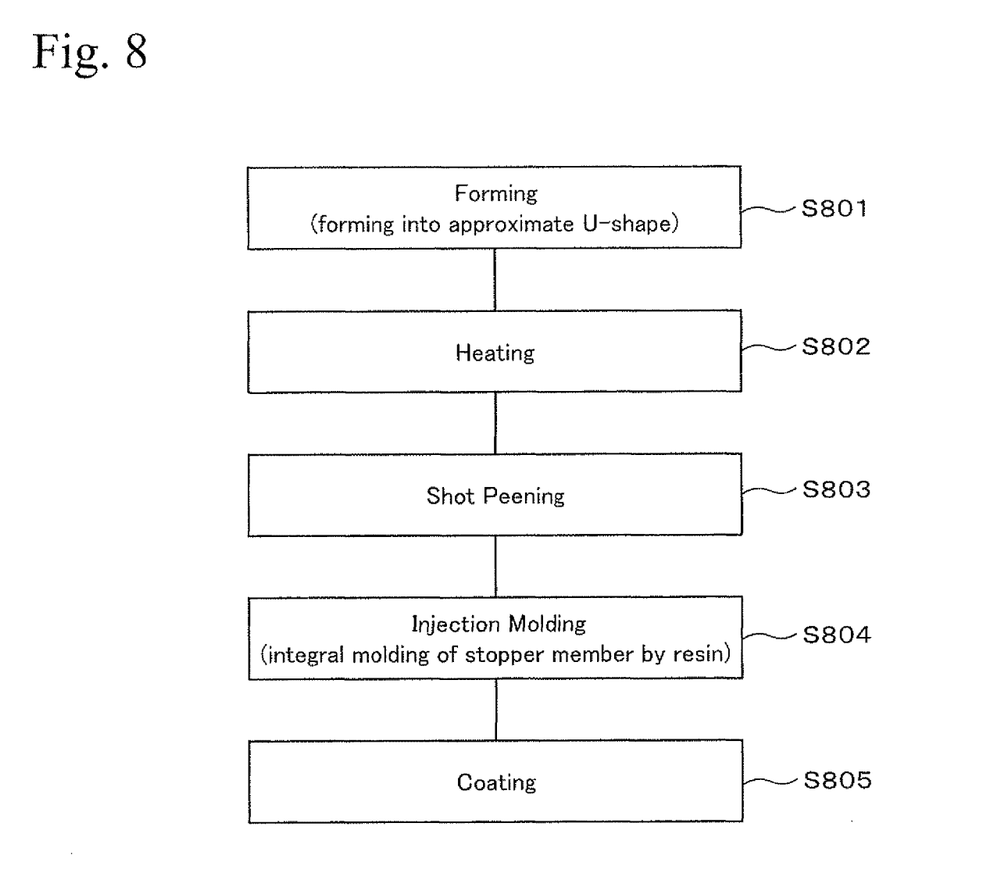
FIG. 8 is a flow chart showing a portion of a production method for a stabilizer device.

The production method for stabilizer device 1 will be explained with reference to Figures. FIGS. 6A and 6B are conceptual diagrams showing an injection molding device. FIG. 6A shows a cross sectional construction of the injection molding device which is cut in the direction perpendicular to the axial direction of the torsion portion, and FIG. 6B shows a cross sectional construction of the injection molding device which is cut in the axial direction of the torsion portion. FIG. 7 is a perspective view showing schematically the injection molding device. FIG. 8 is a flow chart showing a portion of the production method for stabilizer device.

An device for performing integral molding of resin ring by direct injection will be explained. In FIGS. 6A, 6B and 7, an injection molding device 800 for performing direct injection of resin is shown. The injection molding device 800 is equipped with a die 810, an injection machine 840, and an elevating mechanism 850. The die 810 has a lower die 811 and an upper die 812. A gate 811a is provided in the lower die 811. The lower die 811 and the upper die 812 are equipped with cavities 820 and 821 and a grip portion 830. The cavity 820 is used for forming of the resin ring 40 (see FIGS. 2 and 4). The cavity 821 is used for forming of the resin ring 40 (see FIG. 2). The grip portion 830 supports the torsion portion 110 (see FIG. 2). In FIG. 7, the lower half of the cavities 820 and 821 are shown.

The injection machine 840 shown in FIGS. 6A and 6B is an device for injection of resin to the cavity 820 of the die. In FIGS. 6A and 6B, a portion of the cavity 820 is shown, and the cavity 821 has the same structure as the cavity 820. The elevating mechanism 850 is provided at the four corners of the die 810. The elevating mechanism 850 moves the upper die 812 upward and downward in the arrow direction A. When the upper die 812 is moved upward in the arrow direction A by the elevating mechanism 850, the upper die 812 moves apart from the lower die 811. When the upper die 812 is moved downward in the arrow direction A by the elevating mechanism 850, the upper die 812 contacts the lower die 811. When the upper die 812 contacts the lower die 811, the cavities 820 and 821 are formed.

In the production method for the stabilizer 1, first, forming is performed on a bar (step S801). For example, a bar (for example, electroseamed pipe), which has a predetermined length by cutting, is subjected to cold working. Thus, the bar is formed into an approximate U-shape, so that a half-finished stabilizer is produced. Next, heating is performed on the half-finished stabilizer (step S802). For example, the half-finished stabilizer is subjected to heating (for example, hardening and tempering). Next, shot peening is performed on the half-finished stabilizer (step S803). For example, many shots are projected onto the half-finished stabilizer, so that burr or the like on the surface of the torsion portion 110 is removed, and the torsion portion 110 is subjected to surface roughening.

Next, injection molding is performed on the half-finished stabilizer subjected to the above processing (step S804). For example, the half-finished stabilizer is set in the injection molding device 800, and the resin rings 40 and 41 are integrally molded by direct injection.

In the injection molding, first, the half-finished stabilizer is set so as to be positioned at the grip portion 830 of the die 810. Next, the upper die 812 is moved downward in the arrow direction A by the elevating mechanism 850, and the upper die 812 contacts the lower die 811, so that the cavities 820 and 821 are formed. Next, the injection machine 840 is moved in the arrow direction B, the leading end of the injection machine 840 is inserted into the gate 811a of the lower die 811, and the resin is injected from the gate 811a to the cavity 820. In this case, the resin is also injected to the cavity 821. Thus, the resin rings 40 and 41 (shown in FIG. 2) are integrally molded directly to the half-finished stabilizer.

Next, the half-finished stabilizer and the resin rings 40 and 41 are subjected to coating (step S805). The bushes 30 and 31 are provided, so that the stabilizer device 1 shown in FIG. 2 is obtained. The bushes 30 and 31 may be provided when the half-finished stabilizer and the resin rings 40 and 41 are mounted to the vehicle.

In the production method, a gap of 0.6 mm or less is formed between the half-finished stabilizer and the grip portion 830. Thus, the resin injected in the cavities 820 and 821 does not flow to the grip portion 830, and burr is not generated. The generation of burr is inhibited, so that a removal process of burr is unnecessary and the production cost can be reduced.

The coating may be performed before the formation of the resin ring. In the above example, the resin rings 40 and 41 are simultaneously formed, and alternatively, they may be respectively formed. The surface roughening for providing concave-convex shape on the half-finished stabilizer may be performed by polishing instead of shot peening.

Mounting Construction for Stabilizer Device

The portions 10a and 10b of the bar 100 shown in FIG. 2 are mounted to the vehicle body, and flattened portions 121a and 121b are mounted to the left side suspension and the right side suspension via the stabilizer links. That is, at the portions 10a and 10b, the bushes 30 and 31 are covered with the brackets 20 and 24 from the lower side, and the brackets 20 and 24 are fixed at the member 50 of the vehicle body by using the bolts 201 and 203. In this construction, the bushes 30 and 31 are respectively pressed on the resin rings 40 and 41 by the brackets 20 and 24. In this manner, the bar 100 is fixed to the vehicle body via the bushes 30 and 31.

Function of Stabilizer Device

When the vehicle performs cornering at a corner, centrifugal force acts on the vehicle body such that the vehicle body rolls toward the outside of the corner. In this case, the load to the suspension of the corner outside increases, and the load to the suspension of the corner inside decreases. Due to this, the displacement of the suspension of the corner outside is larger than that of the suspension of the corner inside. As a result, the torsion portion 110 of the bar 100 (shown in FIG. 2) of the stabilizer device, of which the left end portion and the right end portion are connected to the left side suspension and the right side suspension via the stabilizer links, twists. The repulsive force, by which the twisted torsion portion 110 returns the initial state, acts on the torsion portion 110, so that the displacement difference between the left side suspension and the right side suspension is inhibited. Thus, the roll angle during the cornering of the vehicle is inhibited. In this case, the bushes made of rubber elastically deforms by the elasticity thereof, so that the roll angle inhibition effects are adjusted, and the torsion portion 110 is effectively twisted.

Superiority

As shown in FIG. 2, the two portions (the portions 10a and 10b) of the bar 100 of the stabilizer device 1 are mounted to the vehicle body. During the above cornering of the vehicle, the force, by which the bushes 30 and 31 move relatively to the bar 100 in the axial direction, acts at the portions 10*a* and 10*b* by the centrifugal force.

In this example, the resin rings 40 and 41 integrally adhere to the bar 100 by the direct injection method. Therefore, the adhesion strength of the resin rings 40 and 41 to the bar 100 is superior to that of a case in which a separate structure or a division structure is used. Since the contact area of the resin rings 40 and 41 to the bar 100 is secured by using the axial direction length of the bushes 30 and 31, the frictional strength of the resin rings 40 and 41 to the bar 100 can be sufficiently obtained.

Since as shown in FIGS. 3A and 3B, the flanges 40*a* and 40*b*, which presses the end portions of the bush 30, are provided at the edge of both the ends of the resin ring 40, the axial direction movement of the bush 30 to the resin ring 40 is inhibited. The surface of the bar 100 contacting the resin ring 40 is subjected to surface roughing by shot peening. Thus, the adhesion of the resin material to the surface of the bar 100 is improved by the anchor effect, the strength for inhibition of the movement of the resin ring 40 to the bar 100 is higher. The effects by the flanges and the surface roughening are also obtained at the resin ring 41.

By the above reasons, high strength (movement strength) to the force by which the bushes 30 and 31 move in the axial direction can be obtained even when the necessary spaces for the resin rings 40 and 41 are small.

MODIFICATION EXAMPLE 1

In the example shown in FIGS. 2, 3A and 3B, the flanges are provided at both sides of the resin ring. Alternatively, the flange may be provided at each side thereof. For example, in the construction shown in FIG. 2, the flange may be provided at the left side end portion of the resin ring 40 disposed at the portion 10*a*, and the flange may not be provided at the right side end portion thereof. The flange may be provided at the right side end portion of the resin ring 41 disposed at the portion 10*b*, and the flange may not be provided at the left side end portion thereof. Alternatively, for example, in the construction shown in FIG. 2, the flange may be provided at the right side end portion of the resin ring 40 disposed at the portion 10*a*, and the flange may not be provided at the left side end portion thereof. The flange may be provided at the left side end portion of the resin ring 41 disposed at the portion 10*b*, and the flange may not be provided at the right side end portion thereof.

Since the force by which the bushes 30 and 31 moves in the axial direction is applied to both of the bushes 30 and 31 in the same direction, the positions of the flanges of the two resin rings are opposite to each other in lateral direction, seen from the front side of the vehicle in order that the above force (axial direction movement force) is applied to the flanges when acting in each direction. Thus, the axial direction movement of the bush to the resin ring can be inhibited.

MODIFICATION EXAMPLE 2

The axial direction length of the resin rings 40 and 41 can be approximately equal to that of the bushes 30 and 31. In this case, the movement inhibition effects by the flanges are not obtained but it is unnecessary to secure a space for flange, and this case is advantageous when arrangement of parts is restricted. When the axial direction length of the resin rings 40 and 41 is shorter than that of the bushes 30 and 31, the contact area between the resin ring and the bar is decreased, the movement inhibition effects by the resin ring may be deteriorated.

MODIFICATION EXAMPLE 3

Figure 9A:
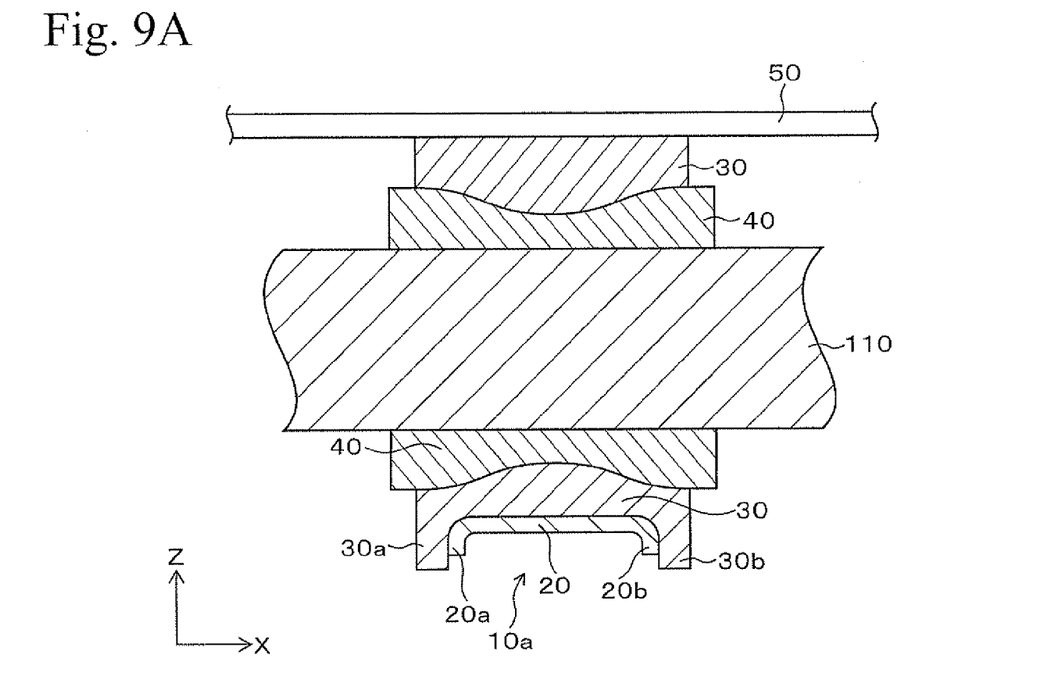
FIGS. 9A and 9B are cross sectional view showing another example of a supporting construction for bar.
Figure 9B:
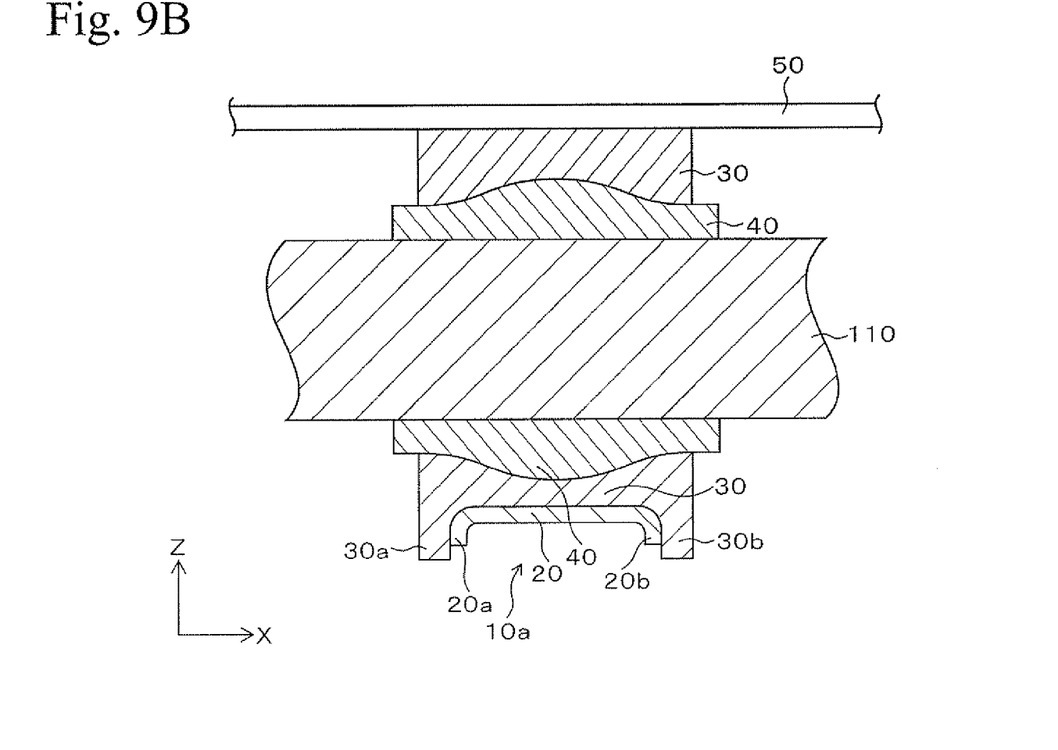

The contact surfaces of the resin ring and the bush engage with each other, and the adhesion strength therebetween can be further improved. FIGS. 9A and 9B are cross sectional views showing another example of cross sectional construction of the portion 10*a* (shown in FIG. 2), which is cut in the axial direction. In the example shown in FIG. 9A, the peripheral surface of the resin ring 40 has a recess at the center portion of the axial direction, and the inner peripheral surface has a convex, with which the recess of the resin ring 40 engages, at the center portion of the axial direction. In the example shown in FIG. 9B, the peripheral surface of the resin ring 40 has a convex at the center portion of the axial direction, and the inner peripheral surface has a recess, with which the convex of the resin ring 40 engages, at the center portion of the axial direction. In the structures, the recess (or the convex) of the resin ring 40 and the convex (or the recess) of the bush 30 engage with each other, and the high strength (movement strength) to the force by which the resin ring and the bush are moved in the axial direction can be improved. This structure can be also used at the portion 10*b* in FIG. 2.

MODIFICATION EXAMPLE 4

Figure 10:
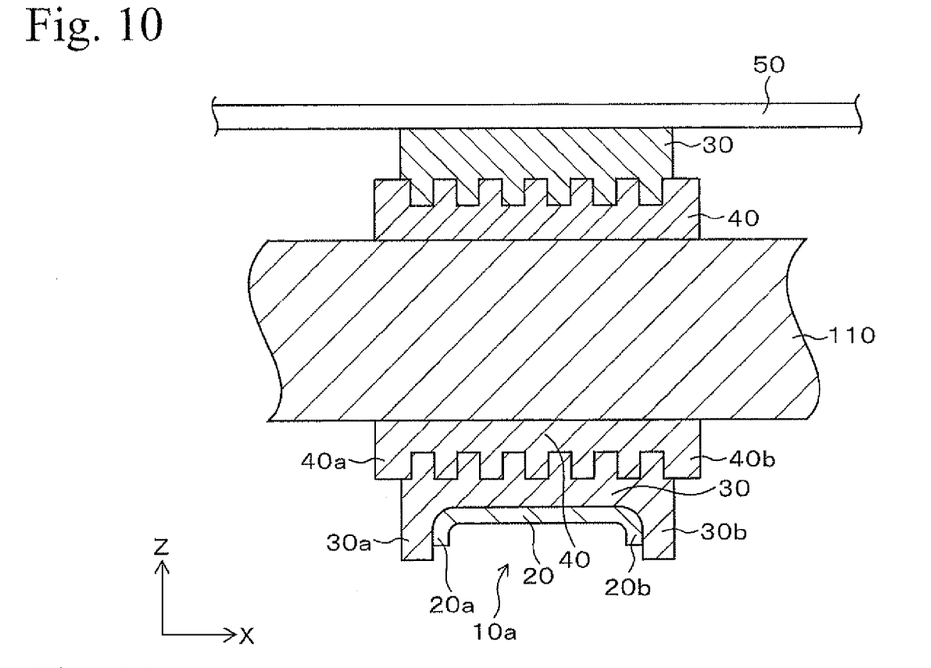
FIG. 10 is a cross sectional view showing another example of a supporting construction for bar.

Another example of engaging structure of the contact surfaces of the resin ring and the bush will be explained. FIG. 10 is a cross sectional view showing another example of cross sectional construction of the portion 10*a* (shown in FIG. 2), which is cut in the axial direction. In the example shown in FIG. 10, the peripheral surface of the resin ring 40 has a concavo-convex structure, and the inner peripheral surface of the bush 30 has a concavo-convex structure, with which the concavo-convex structure of the resin ring 40 engages, at the center portion of the axial direction. In order to form the concavo-convex structure on the peripheral surface of the resin ring 40, a concavo-convex structure is formed on the inner peripheral surface of the cavity 820 shown in FIGS. 6 and 7, and the resin ring 40 is formed by the forming method explained by using FIGS. 6 and 7. In the structure, the resin ring 40 and the bush 30 are joined with each other by the concavo-convex structures thereof, the movement strength therebetween in the axial direction can be further improved. This structure can be also used at the portion 10*b* in FIG. 2.

MODIFICATION EXAMPLE 5

In the modification example 4 shown in FIG. 10, the inner peripheral surface of the bush 30 may not have a concavo-convex structure. In this case, the inner peripheral surface of the bush 30 is embedded to the concavo-convex structure of the peripheral surface of the resin ring 40, and the frictional force therebetween can be secured. This effect can be obtained when the bush 30, which is not made of rubber, has elasticity so as to embed to the concavo-convex structure of the resin ring 40.

MODIFICATION EXAMPLE 6

Figure 11:
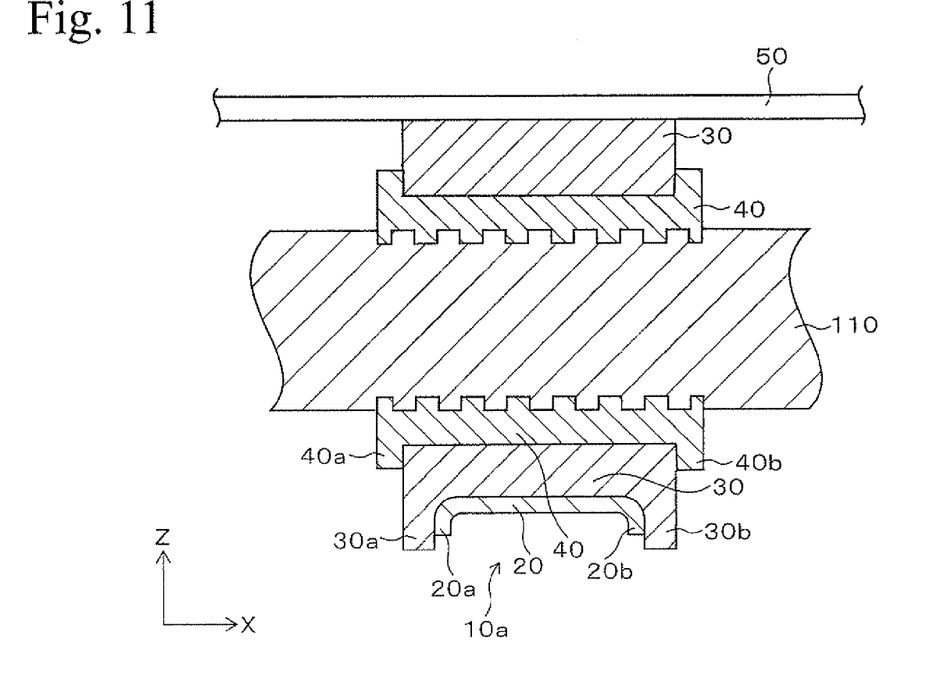
FIG. 11 is a cross sectional view showing another example of a supporting construction for bar.

A concavo-convex structure may be formed by press forming on the surface of the bar on which the resin ring is formed, and the adhesion between the bar and the resin ring can be improved. FIG. 11 is a cross sectional view showing another example of cross sectional construction of the portion 10*a* (shown in FIG. 2), which is cut in the axial direction. In the example shown in FIG. 11, the concavo-convex structure is formed by press working on the peripheral surface of the torsion portion 110, and the resin ring 40 is formed thereat by direct injection. In this construction, the adhesion of the resin ring 40 to the torsion 110 is improved, so that the strength (movement strength) to the force, by which the resin ring 40 is moved to the torsion portion 110 in the axial direction, can be improved.

In the example shown in FIG. 11, the cross section of the groove formed on the surface of the bar has a shape shown in FIG. 11 or has a shape open toward the outer radial direction. An angle of the wall surface of the groove, which extends in a circumferential direction of the groove, with respect to the axial direction is desirably 45 to 90 degrees. In a case that this angle is less than 45 degrees, when the force acts so as to cause the axial direction movement of the resin ring, the force acts such that the inner diameter of the resin ring becomes large, and crack may easily occur in the resin ring of which the strength to tearing force is relatively small. In a case that this angle is 45 degrees or more, when the force acts so as to cause the axial direction movement of the resin ring, the force acts such that the inner diameter of the resin ring becomes small, and force component which tears the resin ring can be small.

ANOTHER MODIFICATION EXAMPLE

The above modification examples can be used in combination. The groove of the concavo-convex structure is not limited to the structure extending in a direction perpendicular to the axial direction, and the groove may have a screw structure (spiral structure) or a mesh structure.

Industrial Applicability

The present invention can be used for a stabilizer device provided to a vehicle such as a car or the like.

The invention claimed is:

1. A stabilizer device comprising:
a bar which has a torsion portion and arm portions extending from both end portions of the torsion portion;
a tubular resin member which is fixed at the torsion portion and has a length in an axial direction; and
a bush which is fixed at the periphery of the tubular resin member and has a length in an axial direction, wherein the length of the tubular resin member is equal to or longer than that of the bush,
wherein the tubular resin member has a concavo-convex structure at a peripheral surface of the tubular resin member, the bush has an inner peripheral surface engaging with the concavo-convex structure of the tubular resin member, and only a portion of the bush is embedded into a recess of the concavo-convex structure of the tubular resin member.

2. The stabilizer device according to claim 1, wherein a flange portion for preventing movement of the bush in the axial direction is provided at least one end of the tubular resin member.

3. The stabilizer device according to claim 1, wherein the bush has an inner peripheral surface having a shape engaging with the concave-convex structure of the tubular resin member.

4. The stabilizer device according to claim 1, wherein the tubular resin member is integrally formed to the torsion portion.

5. The stabilizer device according to claim 1, wherein a Concavo-convex structure is formed on a surface of the torsion portion on which the tubular resin member is fixed.

* * * * *